(No Model.)

B. W. POH.
PIPE COUPLING.

No. 384,073. Patented June 5, 1888.

Witnesses.
Arthur Sangster.
Charles Sangster.

Benjamin W. Poh, Inventor.
By James Sangster, Attorney.

N. PETERS, Photo-Lithographer, Washington, D. C.

UNITED STATES PATENT OFFICE.

BENJAMIN W. POH, OF BUFFALO, NEW YORK, ASSIGNOR TO HIMSELF AND PHILIP STEINGOETTER, OF SAME PLACE.

PIPE-COUPLING.

SPECIFICATION forming part of Letters Patent No. 384,073, dated June 5, 1888.

Application filed February 10, 1888. Serial No. 263,621. (No model.)

*To all whom it may concern:*

Be it known that I, BENJAMIN W. POH, a citizen of the United States, residing in Buffalo, in the county of Erie and State of New York, have invented certain new and useful Improvements in Pipe-Couplings, of which the following is a specification.

My invention relates to certain improvements in coupling pipes for carrying steam or hot air between movable points, and is particularly adapted for conducting steam through railroad-cars, as it permits any of the up and down and side movements of the cars without disturbing the continuity of the joints. It is also adapted for uses where considerable allowance must be made for expansion, and will be fully and clearly hereinafter described and claimed, reference being had to the accompanying drawings, in which—

Figure 1:
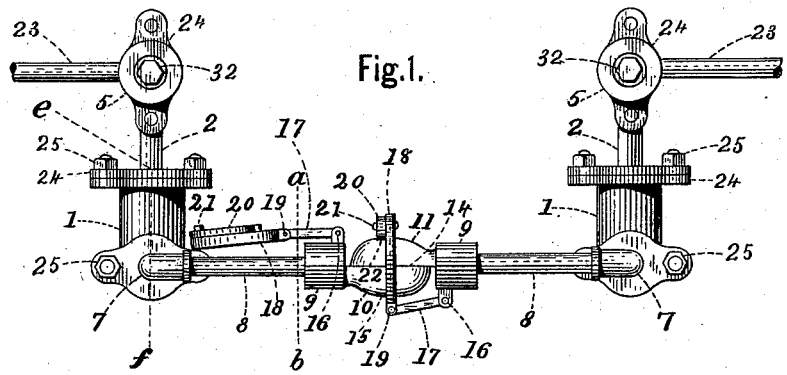
Figure 2:
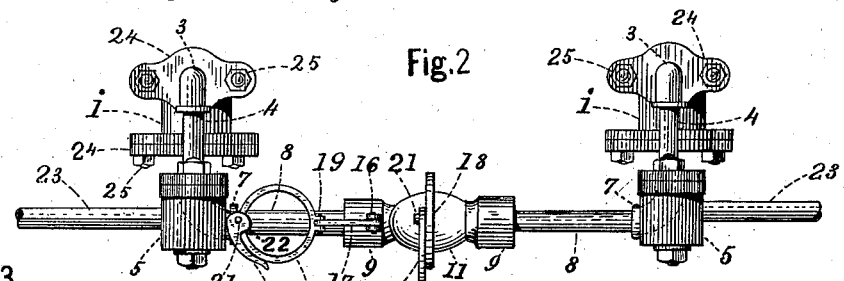
Figure 3:
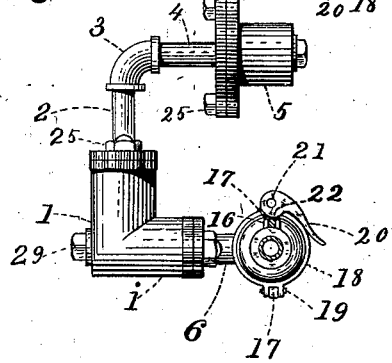
Figure 4:
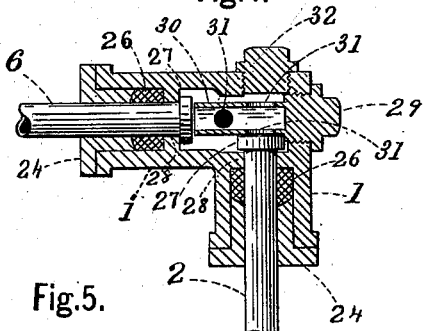
Figure 7:
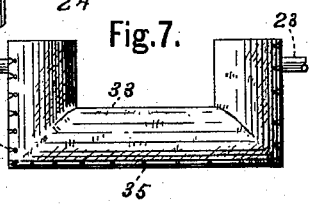
Figure 5:
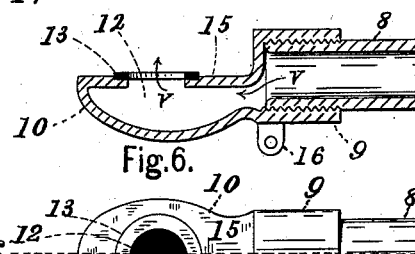
Figure 6:

Figure 1 is a side elevation; Fig. 2, a top plan view. Fig. 3 is a section through line *a b*, Fig. 1. Fig. 4 is a central longitudinal section on line *e f*, Fig. 1, through one of the L-shaped portions of the coupling, showing also a short portion of the pipes connected therewith, all other portions beyond the section being omitted. Fig. 5 is a longitudinal central section through one of the coupling-joints and a portion of the pipe connected with it in line *c d*, Fig. 6. Fig. 6 is a top plan view of one-half of the coupling and a portion of the tube attached to it. Fig. 7 is a side elevation of the device inclosed within a canvas covering for protecting it from dust and dirt.

In said drawings, 1 represents the L-shaped portions of the coupling. Each is provided with a vertical pipe, 2, extending upward and connected by an elbow, 3, to a horizontal pipe, 4, which projects into and is secured to a pipe-joint, 5. From the portion *i* of each of the L-shaped pipe-joints 1 projects a pipe, 6, in the same direction or substantially parallel with the pipes 4, and each is provided with an elbow, 7, having a pipe, 8, projecting in a direction at right angles, or substantially so, to the pipes. To one of the pipes 8 is secured in usual way by a screw-joint, 9, one half, 10, of the coupling-joint, the other half, 11, being secured in the same way to the other pipe 8. The coupling-joint portions 10 and 11 have a free passage through them in the direction of the arrows *v*, passing in from the tubes 8 and out through the holes 12, (see Figs. 5, 6,) and each is provided with a flat face or side, 14 15, and packing-ring 13, of asbestus or other similar material. Both of these coupling portions 10 11 are exactly alike, except that one is adapted to fit below and the other above, as shown in Figs. 1 and 2. To each of the portions 9 is secured two ears, 16, and to the ears is pivoted an arm, 17, having a ring, 18, pivoted to the opposite end of the arm 17 by a pin, 19, and to the rings 18 is a cam-lever, 20, pivoted thereto by a pin, 21. The lever 20 is provided with an eccentric-shaped cam portion, 22. To one side of each of the pipe-joints 5 is secured in the usual way by a screw-joint a pipe, 23. The object of these pipes 23 is to provide the means for carrying the steam or hot air into the cars or wherever it may be designed to convey it.

The several pipes are secured to the pipe-joints 1 and 5 by stuffing-boxes 24 and bolts 25. They are each provided with the usual packing, 26. The inner end of each pipe is provided with a head or collar, 27. (See Fig. 4, showing a section for the purpose of illustrating these parts.) This collar rests on an inner projecting flange, 28, so as to prevent the pipe or tube from being drawn out of place. To stop it from being pushed in too far, I use a plug, 29, having a short tube, 30, projecting far enough to reach it and keep it in place. The tube 30 is provided with holes 31 to permit a free passage for the steam through it. The tube 2 is kept in place by the side of the tube 30, as shown in Fig. 4. The plugs 29 and 32 are large enough so that when taken out the heads of the tubes 2 and 6 will pass through the holes, after which the plugs are put back in place.

The object in having two rings 18 and their operating parts is to have one in reserve in case one should be broken or out of order.

In Fig. 7 I have shown a coupling enveloped in a canvas or flexible material covering, 33, to protect it from dust and dirt. This covering is constructed so as to be laced around the edges 34 35, substantially as shown.

The coupling is secured together by turning either of the rings so as to surround the half to which it is attached and then slipping the other in place, so that the two flat faces and the asbestus rings or packing 13 will lie flat together, as shown in Fig. 1. The eccentric or cam lever 20 is then turned down, as shown in Fig. 3, when the coupling is securely and rigidly held in place.

I claim as my invention—

1. In a pipe-coupling, the combination of two hollow flat-faced coupling portions provided with packing-rings, a ring jointed to an arm pivoted to one of the coupling portions, and a pivoted cam-lever for securing them together, substantially as described.

2. A pipe-coupling consisting of two hollow flat-faced coupling portions, a ring pivoted thereto and provided with a cam-lever for securing them together, in combination with pipes rigidly secured to the coupling portions in a line therewith and at right angles thereto by elbows and by stuffing-boxes with the horizontal portions of L-shaped coupling-joints, and pipes connected by stuffing-boxes to the vertical portions and by elbows to horizontal pipes connected by stuffing-boxes to couplings 5, having pipes rigidly secured to them, as and for the purposes described.

BENJ. W. POH.

Witnesses:
CHARLES SANGSTER,
JAMES SANGSTER.